Nov. 9, 1965      R. M. ROOKER      3,216,159
LAND ANCHOR
Filed March 11, 1963
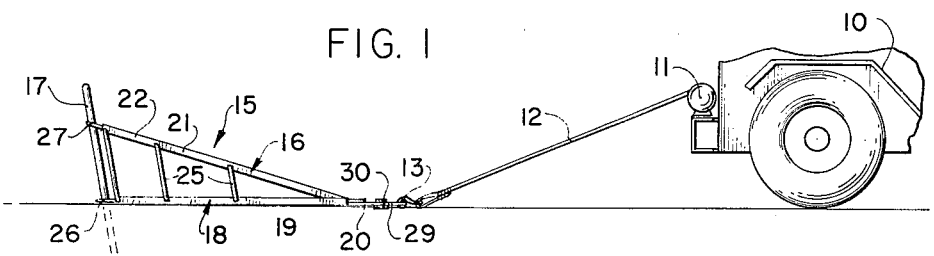
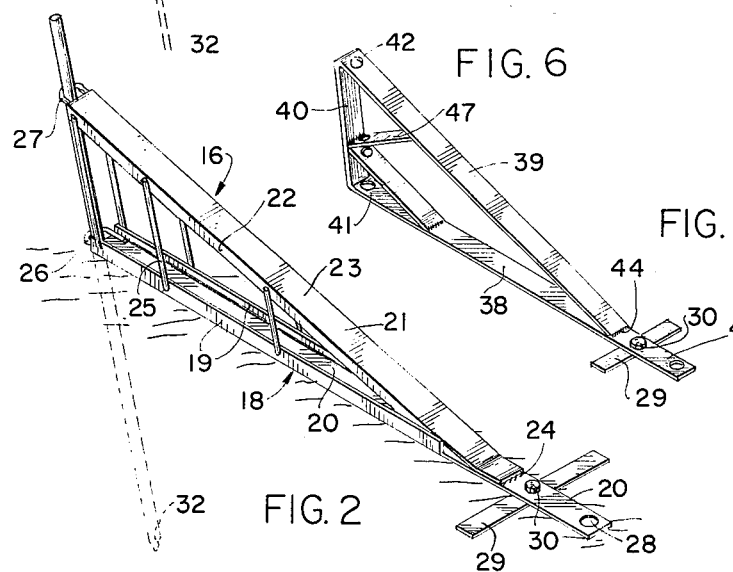
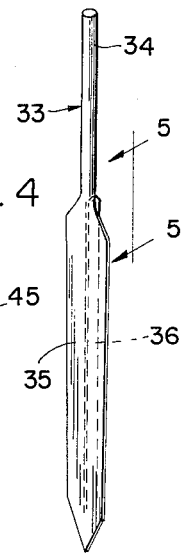
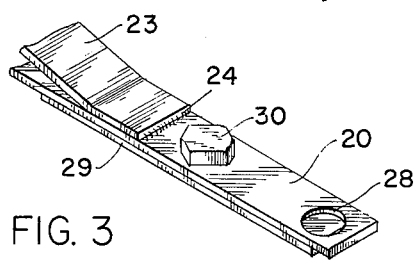
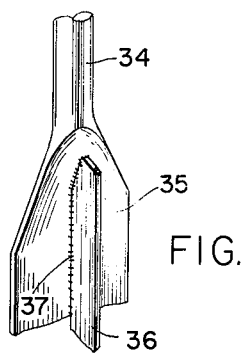
INVENTOR
RANDOLPH M. ROOKER
BY
ATTORNEY

United States Patent Office 3,216,159
Patented Nov. 9, 1965

3,216,159
LAND ANCHOR
Randolph M. Rooker, Norlina, N.C.
Filed Mar. 11, 1963, Ser. No. 264,332
1 Claim. (Cl. 52—158)

This invention relates to apparatus and equipment for securing objects in fixed locations against appreciable movement resulting from the application of force especially in a given direction and thereby providing an anchor by which an object such as, for example, a cable may be attached and utilized to draw an object such as an automobile unable to move under its own power towards such anchor from a remote location.

The invention relates particularly to a land anchor which can be placed in a definite location and to which one end of a cable may be attached with the other end of the cable secured to an object such as a vehicle and by shortening the cable by a winch or windlass or other means the vehicle may be caused to move toward such land anchor.

Motor vehicles operated where the terrain has been such that at times the vehicle becomes stalled and has had to have outside aid in its removal sometimes have been provided with a winch or windlass and cable in order to allow the cable to be attached to a tree or other fixed object and by winding the cable on the winch or windlass the vehicle could be moved from its stalled location. Also where one motor vehicle has been stuck or stalled one or more additional vehicles have been employed to assist in moving the first vehicle from its stalled position. There has not been satisfactory equipment which could be carried by the vehicle and anchored near to a nearby object and used for freeing the vehicle from mud, snow or other unfavorable terrain.

It is an object of the invention to provide a device of simple, inexpensive and lightweight construction which can be readily carried by a vehicle and with little effort can be anchored in the earth for the attachment of a cable and by the application of force a vehicle may be drawn toward such anchored device.

Another object of the invention is to provide a land anchor which can be secured in place merely by the driving of a stake in the ground and with the top end of the stake inclined from the anchor so that when force is applied it will not be at a single location which might cause the stake to pull out of the ground but instead will cause the stake to be maintained and anchored at a predetermined angle.

Another object of the invention is to provide a simple inexpensive land anchor capable of being used in soft or hard earth with a crow bar or other type of independent stake with means for attachment of the anchor at one end to the stake to maintain it at a fixed angle and with means at the other end of the stake for attachment of a cable, and with a transverse bar centrally pivoted so that it can be disposed crosswise of the stake when in use to limit the embedding of the anchor in the earth, and when not in use can be located lengthwise of the anchor for compactness.

Other objects and advantages of the invention will be apparent from the following description taken in conjunction with the accompanying drawing in which:

FIG. 1 is a side elevation illustrating one application of the invention;

FIG. 2, an enlarged perspective of the land anchor;

FIG. 3, an enlarged fragmentary perspective illustrating one end of the land anchor in operative position;

FIG. 4, a fragmentary perspective of the lower portion of a modified construction;

FIG. 5, an enlarged fragmentary perspective of a portion of the opposite side of the stake from that of FIG. 4; and FIG. 6, a perspective of a modified form of land anchor.

Briefly stated the invention is a land anchor having a first or base side adapted to be disposed in a manner to rest upon the earth, a second side having one end attached adjacent one end to the first side and extended at an angle therefrom and having its opposite end spaced from and extending slightly beyond the remote end of the first side so that a line drawn through the spaced ends of the first and second sides will provide an obtuse angle between such line extended and the first side, with means at each of the spaced ends of the first and second sides for holding a stake, and means at the opposite end of the anchor for attachment of a cable, and with a bar attached to the latter end of the anchor and disposable in a transverse position when the anchor is in use, but capable of being moved from such position for compactness when the cable is not in use.

With continued reference to the drawing, a vehicle 10 of the motorized type of conventional construction may have a winch or windlass 11 mounted on the front or other portion thereof and such winch is adapted to be rotated in either direction by any conventional means such as a hand crank motor or the like (not shown). To the winch or windlass is attached a cable 12 having a hook 13 on one end, such cable is adapted to be wound upon the winch 11 in such a manner that when the winch is rotated in one direction the cable will be unwound and when the winch is operated in the reverse direction the cable will be wound.

During normal travel the vehicle will be self propelled by its conventional power plant, however there will be times when the vehicle will be unable to travel due to rough terrain when the power plant does not have sufficient power to propel the vehicle over obstacles such as large rocks or up steep embankments. Likewise there are times when the driving wheels of the vehicle do not have sufficient traction, such as when the wheels are in mud, sand, snow or the like, and outside force is required to move the vehicle sufficiently to continue its travel.

In order to assist the vehicle to move, a generally triangular land anchor 15 is provided and comprises a frame 16 and a stake 17. Instead of the stake 17 a conventional crowbar may be used. The frame includes a first side or base member 18 which may be of generally U-shaped channel construction having right angular flanges 19 connected by an intermediate or bight portion 20.

A second side is provided of similar U-shaped channel construction having right angular flanges 22 connected by an intermediate or bight portion 23. The second side has one end attached as by welding 24 to the bight portion 20 adjacent an end of the first or base side member 18. The upper member 21 is disposed at an angle to the lower member 18 and has its remote end slightly beyond and spaced from the remote end of the first side so that in the triangle there will be an obtuse angle between a line drawn through the spaced ends of said sides and the first side. A plurality of braces 25 may be used to reinforce the first and second sides one towards the other.

Eye forming staples or retainers 26 and 27 may be welded or otherwise attached to the spaced portions of the sides 18 and 21 and projecting outwardly therebeyond. The bight portion 20 of the first or base member 18 extends slightly beyond the flanges 19 and such bight portion is provided with an opening 28 adjacent its forward end.

A cross bar 29 is pivotally attached by a pin 30 to the forwardly extending bight portion of the first member 18 and illustrated in FIG. 2 the cross bar 29 may be located substantially at right angles to the bight portion 20 when in use to prevent the forward portion of the frame 16 from becoming embedded in the ground. As illustrated in FIG. 3, when such cross bar is rotated to a position in substantially longitudinal alignment with the side member 18 to allow the frame to be stored in a small space, such storage can be accomplished.

The stake 17 may be provided with a sharpened end 32 to facilitate penetration of the earth. Such stake may be generally round in cross section and of a length to permit a substantial portion to be driven into the ground and with enough exposed to pass through both of the eyes 26 and 27.

As illustrated in FIGS. 4 and 5 a modified stake 33 may be provided having an upper portion or rod 34 with a flattened blade 35 formed as an integral part thereof or a separate part and permanently attached to the rod 34 in any conventional manner as by welding or the like. The stake 33 is intended primarily for use in relatively loose soil such as sand or the like. In order to prevent rotation of the blade, during insertion or when a pulley force is applied to the frame, such blade may have a reinforcing web or flange 36 attached to one side of the blade 35 by welding 37 with such web extending substantially the full length of the blade.

In the operation of the device when the vehicle 10 encounters an obstacle, loses traction of its driving wheels, or for some other reason cannot move forward, the winch 11 may be rotated in a direction to unwind the cable 12 until the hook 13 is spaced at considerable distance from the vehicle. The land anchor 15 is then removed from the vehicle and taken to the location of the hook 13 and the stake driven into the ground and the hook inserted within the opening 28 on the frame 16. The cross bar 29 is rotated to a position generally at right angles to the frame and then the frame is placed on the ground. After the frame is in position the stake 17 is inserted in the eyes 26 and 27 with the sharpened end 32 in engagement with the ground. The stake is then driven into the ground by a sledge hammer or the like until the stake is firmly fixed. It is noted that due to the unequal lengths of the upper and lower members 18 and 21 the stake must be driven at an angle inclined away from the vehicle which is to apply the pulling force.

When the winch 11 is rotated in the reverse direction tension is applied to the cable 12 and such tension will move the vehicle forward until the vehicle can again proceed under its own power. Any tendency of the pulling force to bend the stake in the direction of the vehicle will be counteracted by the frame 16 so that such stake will always provide a fixed anchor. When the vehicle has been moved a desired distance the stake may be easily withdrawn from the ground since the pulling force will have a tendency to move the stake toward the vehicle thereby loosening the stake.

When the vehicle is immobilized in mud, sand, snow or other medium the stake illustrated in FIGS. 4 and 5 may be used. When this stake is used it is first driven into the ground at approximately the required angle and after the blade 35 has penetrated the earth the frame 16 will be placed over the upper end or rod 34 after which any minor misalignment can be corrected and the stake driven further into the ground.

In FIG. 6 there is illustrated a generally triangular anchor of different construction and in this figure three sides of the triangle are provided which may be of integral construction. In other words, the anchor may have a first or base side 38, an angular side 39, and an intermediate or connecting side 40. The first side has an opening 41 adjacent to the side 40 and the second side has a corresponding opening 42 adjacent to side 40, in which openings 41 and 42 a crow bar or stake 43 may be disposed. Due to the fact that the angle between the first and intermediate sides 38 and 40, respectively, is an obtuse angle, the angle between the portion of the cross bar or stake which penetrates the earth and the first side will be an acute angle so that force supplied lengthwise to the first side will tend to produce greater intimacy between the anchor and the earth.

The first or base side 38 extends beyond the welded connection between the first or base and second sides and is provided with an opening 45 in which the hook 13 attached to the cable 12 may be engaged. Also a cross member 29 may be attached by bolt 30 to the first or base side 38 between the weld 44 and the opening 45 for the purpose described with regard to the previously described embodiment. If desired braces 46 and 47 may be employed for reinforcing the first and second sides. In fabricating the anchor of FIG. 6 portions are cut out to facilitate the bending of the metal.

It will be apparent from the foregoing that a relatively simple, inexpensive land anchor is provided which can be utilized where no fixed structure such as posts, trees and the like are available. Not only can the anchor of the present invention be used in the manner illustrated in FIG. 1 in which a winch applied to a vehicle and operated by hand is used to do the work desired but if desired such hand operated winch may be attached to the anchor and the hook attached to the device to be pulled. It can then be used for drawing objects on wheels such as automobiles or objects without wheels toward the anchor. Likewise it can be used in connection with small boats where it is desired to pull such small boat, with or without a load, onto the beach beyond the water line to keep the rising tide from carrying the boat back to sea, and thereafter it can be used to pull the boat back into the water.

It will be obvious to one skilled in the art that various changes may be made in the invention without departing from the spirit and scope thereof and therefore the invention is not limited by that which is illustrated in the drawing and described in the specification, but only as indicated in the accompanying claim.

What is claimed is:

A land anchor comprising a generally triangular frame and a stake, said frame comprising an elongated generally flat base member, an elongated generally flat member overlying said base member and having one end attached thereto and its opposite end spaced therefrom, and having bracing means between said members securing them in fixed relation with generally aligned spaced stake receiving means at each of the spaced ends of both of said members, and a cross bar pivoted adjacent the attached ends of said members and movable from a transverse position of use to a lengthwise position of non use.

References Cited by the Examiner

UNITED STATES PATENTS

| | | | |
|---|---|---|---|
| 903,942 | 11/08 | Zillgitt | 42—95 |
| 1,308,940 | 7/19 | Eggleston | 52—155 |
| 1,550,276 | 8/25 | Nilson | 52—158 |
| 2,572,205 | 10/51 | Shanks | 248—188.6 |
| 2,678,807 | 5/54 | Funk | 256—24 |

FOREIGN PATENTS 567,815  3/45  Great Britain.

FRANK L. ABBOTT, *Primary Examiner.*

JACOB L. NACKENOFF, RICHARD W. COOKE, JR., *Examiners.*